United States Patent
Hotta et al.

(10) Patent No.: US 6,835,407 B2
(45) Date of Patent: Dec. 28, 2004

(54) OIL-IN-WATER TYPE EMULSION FOOD

(75) Inventors: Masayuki Hotta, Kawasaki (JP); Sumie Satoh, Kawasaki (JP); Yasuko Ishizaki, Kawasaki (JP); Minao Asano, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 200 days.

(21) Appl. No.: 10/108,896

(22) Filed: Mar. 29, 2002

(65) Prior Publication Data

US 2002/0182303 A1 Dec. 5, 2002

(30) Foreign Application Priority Data

Mar. 30, 2001 (JP) ........................................ 2001-099763

(51) Int. Cl.$^7$ ................................................ A23D 7/00
(52) U.S. Cl. ........................ 426/601; 426/602; 426/576
(58) Field of Search .................. 426/602, 601, 426/576, 573

(56) References Cited

U.S. PATENT DOCUMENTS

| | | | | |
|---|---|---|---|---|
| 4,148,929 A | * | 4/1979 | Gorfien et al. | 426/576 |
| 4,234,611 A | * | 11/1980 | Kahn et al. | 426/321 |
| 4,307,125 A | * | 12/1981 | Amer | 426/604 |
| 4,313,967 A | * | 2/1982 | Kahn et al. | 426/327 |
| 4,387,109 A | * | 6/1983 | Kahn et al. | 426/321 |
| 4,390,550 A | * | 6/1983 | Kahn et al. | 426/102 |
| 4,451,492 A | * | 5/1984 | Dell et al. | 426/564 |
| 4,505,943 A | * | 3/1985 | Dell et al. | 426/565 |
| 4,542,035 A | * | 9/1985 | Huang et al. | 426/565 |
| 5,264,226 A | * | 11/1993 | Graille | 426/586 |
| 5,478,569 A | * | 12/1995 | Berneis et al. | 424/456 |
| 5,869,125 A | * | 2/1999 | Lynch et al. | 426/603 |
| 5,939,126 A | * | 8/1999 | Flynn | 426/564 |
| 6,117,473 A | * | 9/2000 | Leshik et al. | 426/564 |
| 6,203,841 B1 | * | 3/2001 | Lynch et al. | 426/564 |
| 6,468,577 B2 | * | 10/2002 | Wofford | 426/576 |
| 6,500,477 B2 | * | 12/2002 | Wofford | 426/576 |
| 6,503,553 B1 | * | 1/2003 | Flynn | 426/564 |
| 2002/0054952 A1 | * | 5/2002 | Wofford | 426/646 |
| 2002/0076474 A1 | * | 6/2002 | Wofford | 426/573 |

OTHER PUBLICATIONS

Kroschwitz 1994 Encyclopedia of Chemical Technology 4th ed vol 12 John Wiley & Sons New York p 406–416.*
Budavari 1996 the Merck Index 12th ed. Merck & Co, Inc. Whitehouse Station, NJ p 742–743.*
Dickinson, E. 2001. J. of Food Science 66(1)118.*
Choi, S. S. 2000. J. of Food Science 665(2)194.*
cGee, H. 1984. On Food and Cooking. Collier Books, MacMillan Publishing Co. , New York. 248–353.*
Anon. 1982. The American Heritage Dictionary. Houghton Mifflin Company. Boston, Ma. p. 514,562,450.*
U.S. Appl. No. 09/696,240, filed Oct. 26, 2000, Pending.
U.S. Appl. No. 10/108,896, filed Mar. 29, 2002, Pending.

* cited by examiner

Primary Examiner—Carolyn Paden
(74) Attorney, Agent, or Firm—Oblon, Spivak, McClelland, Maier & Neustadt, P.C.

(57) ABSTRACT

There is provided an oil-in-water type emulsion food comprising a gelatin, in which the gelatin contains 13% by weight or less of a gelatin fraction having a molecular weight of 20,000 or less. The emulsion food exhibits a marked improvement in cold resistance such as refrigeration resistance, freeze resistance or the like. A fish gelatin is preferred as this gelatin.

26 Claims, No Drawings

OIL-IN-WATER TYPE EMULSION FOOD

CROSS REFERENCES TO RELATED APPLICATIONS

This application claims priority to Japanese Patent Application No. 2001-099763, filed on Mar. 30, 2001, which is incorporated herein by reference in its entirety.

BACKGROUND OF THE INVENTION

1. Field of the Invention

The present invention relates to novel oil-in-water type emulsion foods, which exhibit excellent cold resistance (stability) such as refrigeration resistance (stability), freeze resistance (stability), or the like.

2. Discussion of the Background

In recent years, freeze-processed foods such as frozen foods, frozen vegetables and the like have been increasingly demanded. Accordingly, improved cold resistance such as refrigeration resistance, freeze resistance, or the like has been sought for dressings, mayonnaise, and spreads as well.

By the way, gelatin having food properties such as gelability, emulsifiability and the like is used as various foodstuffs, and also widely used as an emulsifier in dressings and mayonnaise.

For example, gelatin is added to an oil-in-water type emulsion food by a method using a modified gelatin obtained by heat treatment along with water and sugar (see Japanese Patent Kokai Publication JP-A-11-318,355). This method is, however, for imparting a heat resistance to an oil-in-water type emulsion food by preheating gelatin. No description or suggestion is found of imparting a freeze resistance therein.

As an approach for imparting a freeze resistance by adding gelatin to an oil-in-water type emulsion food, a large number of methods such as a method in which gelatin is blended with at least one of milk whey protein, caseinate, and a polyglycerin fatty acid ester (see Japanese Patent Kokai Publication JP-A-60-137,260); a method in which egg yolk is incorporated in an amount of 2% or more, milk protein in an amount of 0.5% by weight or more, and gelatin in an amount of 0.3% or more, and an amount of an oily phase is adjusted to 40% or less (see Japanese Patent Kokai Publication JP-A-9-149,772); a method in which appropriate amounts of gelatin and hydrolyzed starch are added to mayonnaise (see Japanese Patent Kokai Publication JP-A-49-26,439); and the like are known.

Since, however, gelatin is not examined and studied in detail in these methods, there is no description of the molecular weight of the gelatin or of the use of fish gelatin in these publications.

In this regard, Japanese Patent Kokai Publication JP-A-49-26,439 describes on page 2, left column, line 16 to right column, line 2 that "However, in a product containing only gelatin added, remaining water unbound migrates onto a surface during the freezing (freeze-up), so that an ice layer is formed on the mayonnaise surface." Thus, it is understood that according to this method, an adequate freeze resistance cannot be imparted with the gelatin only. For this reason, there is a need to add a milk whey protein, a hydrolyzed starch and the like. As a result, this approach involves problems in that an unpleasant flavor or an unpleasant feel in the mouth, such as a rough feel, is provided.

As an attempt to impart a freeze resistance using fish gelatin, the prevention of water separation from a frozen food by mixing a fish gelatin powder to foodstuffs before coagulation (solidification) has been proposed (an agent for prevention of water separation using the fish gelatin; see Japanese Patent Kokai Publication JP-A-11-164,655). However, this method is limited to the prevention of water separation from foods or foodstuffs such as tofu (soybean curd), chawan-mushi (steamed egg custard), croquette, konnyaku (devil's tongue jelly) and the like, and it does not focus on de-emulsification (destruction of emulsification) by separation between an aqueous phase and an oily phase, which is a problem encountered in freezing an oil-in-water type emulsion.

Thus, there remains a need for oil-in-water type emulsion foods which exhibit an improved cold resistance (stability to storage at low temperatures). There also remains a need for methods for preparing such foods.

SUMMARY OF THE INVENTION

Accordingly, it is one object of the present invention to provide an excellent oil-in-water type emulsion food which is markedly improved in cold resistance such as refrigeration resistance, freeze resistance, or the like, especially freeze resistance.

It is another object of the present invention to provide novel methods for preparing such foods.

It is another object of the present invention to provide novel methods for imparting improved cold resistance to oil-in-water emulsion type foods.

These and other objects, which will become apparent during the following detailed description, have been achieved by the present inventors' discovery that the cold resistance, especially the freeze resistance, of an oil-in-water type emulsion is markedly improved by the presence of gelatin, in which the content of the gelatin ingredient(s) (fraction(s)), which have a molecular weight of 20,000 or less, is 13% by weight or less. This finding has led to the completion of the present invention.

That is, the present invention provides an oil-in-water type emulsion food, comprising gelatin, in which the gelatin comprises 13% by weight or less of ingredient(s) (a fraction; gelatin ingredient(s)) having a molecular weight of 20,000 or less. In other words, the amount of the gelatin fraction, which has a molecular weight of 20,000 or less, does not exceed 13% by weight of the total weight of the gelatin in the oil-in-water type emulsion food product.

As this gelatin, fish gelatin is preferable.

An oil-in-water type emulsion food, comprising 0.1 to 5.0% by weight of such a gelatin and 35 to 70% by weight of an oily phase is especially preferable in view of production and/or taste.

DETAILED DESCRIPTION OF THE PREFERRED EMBODIMENTS

The present invention is described in detail below. In the description of the present invention, "%" indicated below means "% by weight" unless particularly otherwise indicated.

Gelatin includes various types depending on the origin of the raw material and/or the production method. Among others, an effect of imparting a high freeze resistance has been found for fish gelatin. In the present invention, a gelatin in which the content of gelatin ingredient(s) (the gelatin fraction) having a molecular weight of 20,000 or less is 13% by weight or less, preferably 10% weight or less, is used. In the context of the present invention, the molecular weights of the fractions of the gelatin may be determined by gel filtration as described in the Examples.

With respect to a possible lower limit for the content of such a gelatin ingredient(s) in said gelatin in the present invention, generally a gelatin which has a content of 1 or 2% by weight or so of a fraction having a molecular weight of 20,000 or less therein can be obtained. In case of a considerable purification, a gelatin having a content of 0% by weight (essentially none of such gelatin ingredient(s)) may be obtained.

For such gelatin used in the present invention, a fish gelatin is especially preferable. However, the gelatin employed in the present invention is not limited thereto.

Fish gelatin, if used, in the present invention is not particularly limited so long as it is derived from a fish (extracted gelatin therefrom or the like). For example, the type of fish, the extraction method, and the like are not particularly limited. For example, cod, salmon, trout, and the like are advantageously used as the fish in view of the production, because gelatin can be extracted therefrom by a general method.

The type of gelatin used in the present invention is not particularly limited. It can be used in any form, for example, a powdery form, a flaky form, and the like.

In the present invention, the gelatin may be used as such. However, when the gelatin is used after being heated and dissolved with the addition of an appropriate amount of water at a temperature appropriate for each gelatin, it is easy to use in the production of the oil-in-water emulsion type food.

In the present invention, the raw materials of the aqueous phase in the emulsion food are not particularly limited so long as they are edible raw materials. For example, seasonings, spices, acid ingredients, coloring matters and the like can be used and added as required. The types and proportions thereof can be adjusted, as required, according to the use (application) and type of the emulsion food.

In the present invention, the raw material of the oily phase in the emulsion food is not particularly limited so long as it is an edible oil. Rapeseed oil, soybean oil, corn oil, sesame oil, olive oil, and the like which are liquid at room temperature are usually employed.

Seasonings, spices, coloring matters, nutrition enriching ingredients and the like can also be added, as required, to the oily phase of the oil-in-water type emulsion food of the present invention so long as they are edible. The types, the proportions and the like of these ingredients can be adjusted, as required, according to the use and type of the emulsion food.

It is not particularly difficult to produce the oil-in-water type emulsion food in the present invention, and the present foods can be produced by, for example, conventional methods. For example, the present foods may be obtained by: (1) mixing, and dissolving or dispersing all the raw materials of the aqueous phase; (2) stirring the resulting mixture while adding thereto the raw materials of the oily phase for pre-emulsification; and (3) then finishing the pre-emulsified product with a colloid mill or the like for emulsification.

In the present invention, the oil-in-water type emulsion food generally means a wide range of oil-in-water type emulsion foods, and the proportions of the emulsion raw materials in the composition can be adjusted as required. Gelatin can be used in an amount of, preferably 0.1 to 5.0% by weight, more preferably 0.3 to 1.0% by weight, based on the total weight of the emulsion food. When the gelatin is present in an amount of less than 0.1% by weight, no satisfactory effect is obtained with respect to the cold resistance in the resulting food. Further, when the amount of gelatin exceeds 5.0% by weight, the feel in the mouth (eating quality) is not so good presumably due to the gelability (gelation characteristics) of the gelatin.

Further, the oily phase can be incorporated in an amount of, preferably 35 to 70% by weight or so, and more preferably 41 to 60% by weight or so, based on the total weight of the oil-in-water type emulsion food. Even when the oily phase is present in an amount of less than 35% by weight, an effect of cold resistance is provided. Thus, when the amount of an oily phase in an oil-in-water type emulsion is small, de-emulsification (destruction of emulsification) due to freezing or refrigeration hardly occurs inherently. Therefore, it is in those foods, which contain a large amount of an oily phase, that the effect of the present invention is markedly apparent.

The aqueous phase can be incorporated in an amount of, preferably 30 to 65% by weight or so, and more preferably 40 to 59% by weight or so, based on the total weight of the oil-in-water type emulsion food.

The present oil-in-water type emulsion foods may further comprise an emulsifier. Useful emulsifiers which may be used in the present oil-in-water type emulsion food products include polyglycerol fatty acid esters, mono- and diglycerides of fatty acids, propylene glycol esters, sucrose fatty acid esters, sorbitan fatty acid esters and the like. Mixtures of emulsifiers may also be employed. These emulsifiers are well known in the art and are commercially available.

Moreover, the present oil-in-water type emulsion food product may further contain an emulsion stabilizer, such as xantham gum, propylene glycol alginate, guar gum, locust bean gum, gellan gum, gum Arabic, cellulose gums, microcrystalline cellulose, modified food starches, and the like.

Other features of the invention will become apparent in the course of the following descriptions of exemplary embodiments, which are given for illustration of the invention and are not intended to be limiting thereof.

EXAMPLES

Examples

A series of oil-in-water type emulsions was produced using the following process for producing an emulsion and according to the formulations shown in Table 1 below. The types of gelatin added were selected as described below. The thus-obtained oil-in-water type emulsions were evaluated by a test for freeze resistance described below.

A. Formulation of the Emulsions:

TABLE 1

Formulation of an oil-in-water type emulsion (amounts in g)

| Composition | Control | Gelatin addition |
|---|---|---|
| salad oil | 80 | 80 |
| emulsifier (SY Grister MSW-750 made by Sakamoto Yakuhin Kogyo K.K.) | 2.5 | 2.5 |
| Water | 117.5 | 116.9 |
| Gelatin | 0 | 0.6 |

B. Types of Gelatin Added:

AP-100 (made by Nitta Gelatin)—acid treatment; low jelly strength;

R (made by Nitta Gelatin)—alkali treatment; low jelly strength;

AE (made by Nitta Gelatin)—acid treatment; high jelly strength;

CLV (made by Nitta Gelatin)—alkali treatment; high jelly strength;

Fish Gelatin Standard (made by Norland Co.); and

Fish Gelatin high molecular weight (made by Norland Co.).

C. Production of the Emulsions:

12 g of water and the amount of gelatin given in Table 1 for the formulation were mixed and heated at 40 to 60° C. to dissolve the gelatin. To this gelatin aqueous solution was added a mixture obtained by mixing and heating the remaining water and the emulsifier at 40° C. to form an aqueous phase. While salad oil heated at 50° C. was gradually added to the aqueous phase, the mixture was stirred with a disperser (Ultra Turrax T25 made by Janke & Kunkel Co.) at 11,000 rpm for 1 minute and then at 22,000 rpm for a further 2 minutes to obtain the desired emulsions.

D. Conditions for Analysis of the Molecular Weight of the Gelatin:

The molecular weight of gelatin was measured under the following conditions.

Method for measuring molecular weight by gel filtration: PAGI method;

Type of a buffer: 0.1M potassium phosphate buffer, pH 6.0;

Column: Shodex GS620 7G (made by Showa Denko K.K.), 2 pieces connected in series;

Flow rate: 1.0 ml/min, isocratic;

Column temperature: 50° C.;

Detection method: absorbance (absorption degree) of 230 nm as a measurement wavelength; and Standard: A calibration curve was obtained by using, as a standard, gelatin with a generally known molecular weight (α chain alone . . . 100,000, α+β combination . . . 200,000, α+β+γ combination . . . 300,000) to calculate a molecular weight.

E. Test for Freeze Resistance:

Each of the resulting emulsions was stored at −10° C., and thawed. Then, the emulsified condition was visually evaluated. The results are given in Table 2.

TABLE 2

Results of a test for a freeze resistance

| Gelatin added | Amount of fraction with a molecular weight of 20,000 or less (% by weight) | Amount of fraction with a molecular weight of 300,000 or more (% by weight) | Total evaluation of freeze resistance |
|---|---|---|---|
| no addition of gelatin | — | — | X |
| AP-100 (acid treatment; low jelly strength) | 32.9 | 3.0 | X |
| R (alkali treatment; low jelly strength) | 17.0 | 12.0 | X |
| AE (acid treatment; high jelly strength) | 14.6 | 14.5 | X |
| CLV (alkali treatment; high jelly strength) | 10.5 | 21.0 | ○ |
| Fish Gelatin Standard | 9.0 | 1.3 | Δ |
| Fish Gelatin high molecular weight | 5.2 | 13.4 | ○○ |

○○ very good
○ good
Δ slight separation of an oily phase
X complete separation of an oily phase As is clear from these results, it is found that the emulsion using gelatin containing 13% by weight or less of a gelatin ingredient (fraction) having a molecular weight of 20,000 or less according to the present invention is quite excellent in the freeze resistance.

Effects of the Invention

According to the present invention, an oil-in-water type emulsion food, which is markedly improved in freeze resistance, can be provided by the presence of a gelatin, especially, a fish gelatin, containing 13% by weight or less of a gelatin ingredient (fraction), which has a molecular weight of 20,000 or less. In the context of the present invention, the terms cold resistance, refrigeration resistance, and freeze resistance should be understood to include resistance to separation of the emulsion on cold storage, such as storage in a refrigerator or freezer. The present invention is therefore quite useful industrially.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

What is claimed is:

1. An oil-in-water type emulsion food, comprising:
    (a) an oily phase;
    (b) an aqueous phase; and
    (c) gelatin,
    wherein said gelatin comprises a gelatin fraction having a molecular weight of 20,000 or less in an amount of 1 to 13% by weight, based on the total weight of said gelatin.

2. The oil-in-water type emulsion food of claim 1, wherein said gelatin is present in an amount of 0.1 to 5.0% by weight, based on the total weight of said oil-in-water type emulsion food.

3. The oil-in-water type emulsion food of claim 1, wherein said oily phase is present in an amount of 35 to 70% by weight, based on the total weight of said oil-in-water type emulsion food.

4. The oil-in-water type emulsion food of claim 1, wherein said gelatin is present in an amount of 0.1 to 5.0% by weight, based on the total weight of said oil-in-water type emulsion food; and wherein said oily phase is present in an amount of 35 to 70% by weight, based on the total weight of said oil-in-water type emulsion food.

5. The oil-in-water type emulsion food of claim 1, wherein said gelatin is present in an amount of 0.3 to 1.0% by weight, based on the total weight of said oil-in-water type emulsion food; and wherein said oily phase is present in an amount of 41 to 60% by weight, based on the total weight of said oil-in-water type emulsion food.

6. The oil-in-water type emulsion food of claim 1, wherein said gelatin comprises said gelatin fraction having a molecular weight of 20,000 or less in an amount of 1 to 10% by weight, based on the total weight of said gelatin.

7. The oil-in-water type emulsion food of claim 1, wherein said gelatin is fish gelatin.

8. The oil-in-water type emulsion food of claim 1, which exhibits an improved stability to storage at a cold temperature as compared to the same food which does not contain said gelatin.

9. The oil-in-water type emulsion food of claim 1, wherein said gelatin is present in an amount of 0.3 to 1.0% by weight, based on the total weight of said oil-in-water type emulsion food.

10. The oil-in-water type emulsion food of claim 1, wherein said aqueous phase is present in an amount of 30 to 65% by weight, based on the total weight of said oil-in-water type emulsion food.

11. The oil-in-water type emulsion food of claim 1, further comprising an emulsifier.

12. The oil-in-water type emulsion food of claim 1, further comprising an emulsion stabilizer.

13. An oil-in-water type emulsion food comprising
   (a) an oily phase;
   (b) an aqueous phase; and
   (c) fish gelatin,
   wherein said fish gelatin is present in an amount of 0.1 to 5.0% by weight, based on the total weight of said oil-in-water type emulsion food; and
   wherein said oily phase is present in an amount of 35 to 70% by weight, based on the total weight of said oil-in-water type emulsion food.

14. The oil-in-water type emulsion food of claim 13, which exhibits an improved stability to storage at a cold temperature as compared to the same food which does not contain said fish gelatin.

15. A method for preparing an oil-in-water type emulsion food, said method comprising mixing:
   (a) an oily phase;
   (b) an aqueous phase; and
   (c) gelatin,
   to obtain an emulsion,
   wherein said gelatin comprises a gelatin fraction having a molecular weight of 20,000 or less in an amount of 1 to 13% by weight, based on the total weight of said gelatin.

16. The method of claim 15, wherein said gelatin is present in an amount of 0.1 to 5.0% by weight, based on the total weight of said oil-in-water type emulsion food; and wherein said oily phase is present in an amount of 35 to 70% by weight, based on the total weight of said oil-in-water type emulsion food.

17. The method of claim 15, wherein said gelatin is present in an amount of 0.3 to 1.0% by weight, based on the total weight of said oil-in-water type emulsion food.

18. The method of claim 15, wherein said aqueous phase is present in an amount of 30 to 65% by weight, based on the total weight of said oil-in-water type emulsion food.

19. The method of claim 15, further comprising adding an emulsifier.

20. The method of claim 15, further comprising adding an emulsion stabilizer.

21. A method for improving the stability of an oil-in-water type emulsion food to storage at a cold temperature, said method comprising incorporating a gelatin into an oil-in-water type emulsion food, wherein said gelatin comprises a gelatin fraction having a molecular weight of 20,000 or less, and wherein said gelatin fraction is present in an amount of 1 to 13% by weight, based on the total weight of said gelatin.

22. The method of claim 21, wherein said gelatin is incorporated into said oil-in-water type emulsion food in an amount of 0.1 to 5.0% by weight, based on the total weight of said oil-in-water type emulsion food; and wherein said oily phase is present in said oil-in-water type emulsion food in an amount of 35 to 70% by weight, based on the total weight of said oil-in-water type emulsion food.

23. The method of claim 21, wherein said gelatin is incorporated into said oil-in-water type emulsion food in an amount of 0.3 to 1.0% by weight, based on the total weight of said oil-in-water type emulsion food.

24. The method of claim 21, wherein the aqueous phase of said oil-in-water emulsion is present in an amount of 30 to 65% by weight, based on the total weight of said oil-in-water type emulsion food.

25. The method of claim 21, further comprising incorporating an emulsifier.

26. The method of claim 21, further comprising incorporating an emulsion stabilizer.

* * * * *